US012738274B1

(12) United States Patent
Myers et al.

(10) Patent No.: US 12,738,274 B1
(45) Date of Patent: Sep. 15, 2026

(54) DETECTING STATISTICAL ANOMALIES IN VOICE INTERACTIONS

(71) Applicant: Citibank, N.A., New York, NY (US)

(72) Inventors: James Randolph Myers, Clearwater Beach, FL (US); Jefferson Okraku, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/633,934

(22) Filed: Mar. 30, 2026

(51) Int. Cl.
*G10L 15/22* (2006.01)
*G10L 25/63* (2013.01)

(52) U.S. Cl.
CPC .............. *G10L 15/22* (2013.01); *G10L 25/63* (2013.01); *G10L 2015/227* (2013.01)

(58) Field of Classification Search
CPC .... G10L 15/22; G10L 25/63; G10L 2015/227
See application file for complete search history.

(56) References Cited

U.S. PATENT DOCUMENTS 12,634,322 B1 * 5/2026 Bhardwaj ........... H04L 63/1425

FOREIGN PATENT DOCUMENTS

CN 119132308 A * 12/2024 .......... H04M 3/2281
CN 120526802 A * 8/2025 .......... H04M 3/2281
CN 120852029 A * 10/2025 ............ G10L 25/63
CN 120998227 A * 11/2025 ............... G06N 3/08
CN 121483243 A * 2/2026 ............ G06F 40/30

* cited by examiner

*Primary Examiner* — Bhavesh M Mehta
*Assistant Examiner* — Eunice Lee
(74) *Attorney, Agent, or Firm* — Ashurst Perkins Coie US LLP; Sumedha Ahuja; Willa Wu

(57) ABSTRACT

The systems and methods disclosed herein detect indicators of undesirable intent during interactions between users and digital avatars by evaluating emotional signals in user speech. The system generates emotion feature vectors from user input streams that capture characteristics such as pitch variation, speech rate, vocal intensity, spectral features, and so forth. The system uses a two-level evaluation that compares the emotion feature vector against a population baseline derived from historical user interactions to generate a population anomaly score and further compares the emotion feature vector against an allow list database and a deny list database to generate a threat match score based on known protected categories (e.g., threat categories, allowed categories). The system aggregates these scores to produce a risk score, which is evaluated against threshold values to determine a response action (e.g., logging the interaction, injecting clarifying questions, routing to human agents, terminating the interaction).

20 Claims, 7 Drawing Sheets

DETECTING STATISTICAL ANOMALIES IN VOICE INTERACTIONS

BACKGROUND

An artificial intelligence (AI) model refers to a computational construct that processes input data to generate output data based on learned patterns. AI models are trained using datasets that include input-output pairs to enable the model to identify correlations between input features and corresponding outputs. During training, the AI model adjusts internal parameters, such as weights and biases in neural network architectures, to minimize or otherwise reduce a loss function that quantifies the difference between predicted outputs and actual outputs. Once trained, the AI model applies these learned parameters to new input data to generate predictions, classifications, or other outputs. AI models can be implemented using various architectures, including neural networks, support vector machines, decision trees, and ensemble methods.

A digital AI avatar (e.g., a conversational AI avatar) is an AI-based interface that can engage in dialogue with users through natural language processing. The digital AI avatar receives input from a user, such as speech captured via a microphone, video captured via a camera or other recording device, or text entered via a keyboard, and evaluates the input to determine a response. The response is delivered to the user through an output modality, such as synthesized speech or displayed text. Digital AI avatars are deployed in various applications, including customer service, financial transactions, healthcare consultations, and technical support. The avatar's behavior is typically controlled by underlying AI models that manage dialogue state and generate responses aligned with the avatar's defined operational parameters. However, existing digital AI avatars are typically unable to distinguish between legitimate or otherwise allowed users and adversarial or otherwise denied/malicious actors who apply paraphrasing, social engineering, or other evasion techniques that circumvent conventional keyword-based detection methods.

Figure 1:
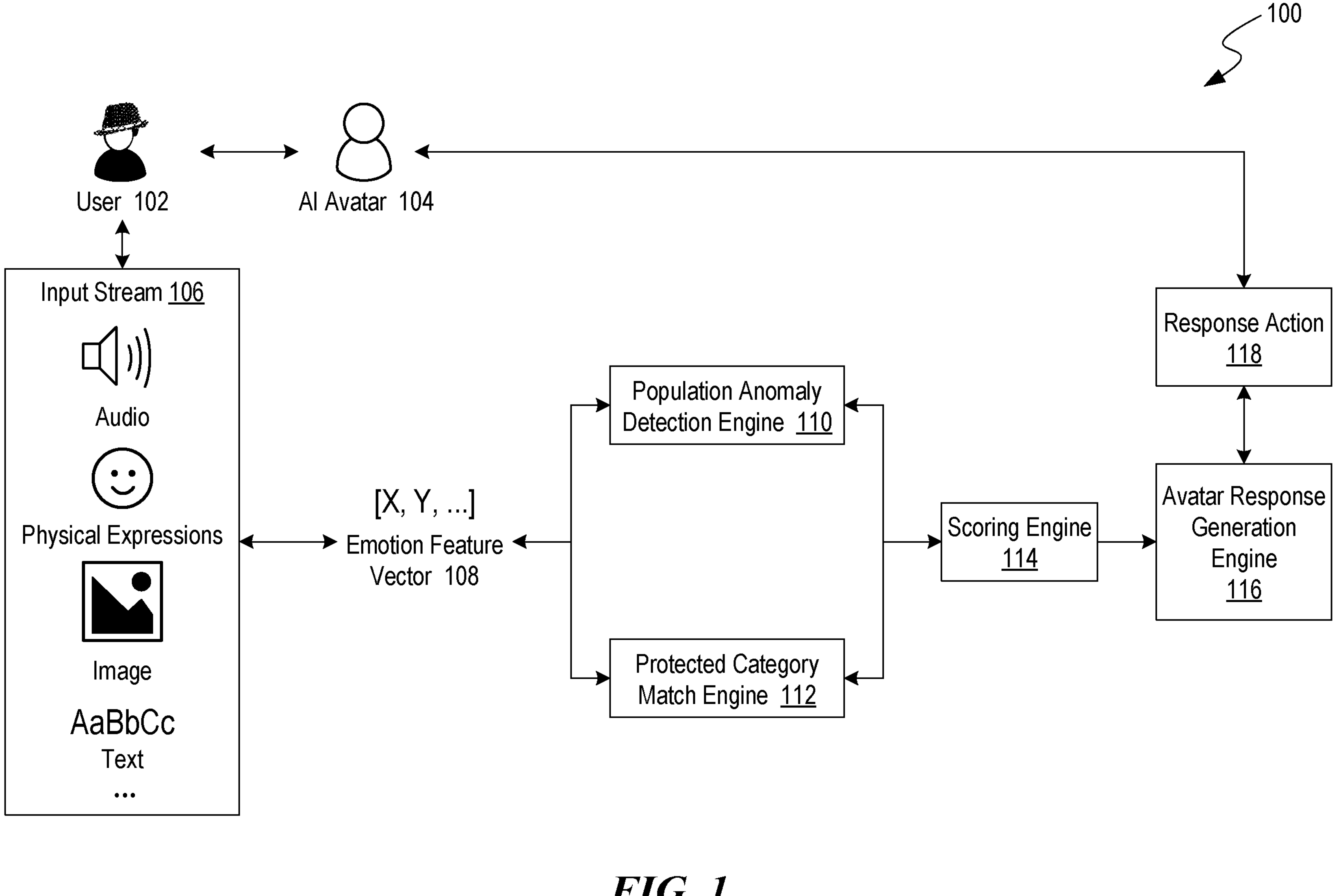
FIG. 1 is a schematic illustrating an example architecture of an anomaly detection platform used to detect user intent, in accordance with some implementations of the present technology.

The drawings have not necessarily been drawn to scale. For example, some components and/or operations are separated into different blocks or combined into a single block for the purposes of discussion of some of the implementations of the disclosed system. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Digital AI avatars generate responses to users by evaluating the content of user input and selecting replies based on the identified semantic meaning of the user's words. When a user communicates with an AI avatar through, for example, speech or text, the AI avatar identifies the user's intent by determining what the user is asking for or what action the user desires to perform. For example, if a user inputs "reschedule my Tuesday meeting to Thursday," the AI avatar recognizes that the user desires to modify an existing appointment and identifies the original date and the new date from the request. The AI avatar can maintain a record of the conversation as it progresses, storing what the user has input and what responses the AI avatar has provided. This conversation history enables the AI avatar to understand references to earlier parts of the interaction. Based on the identified intent and the conversation history, the AI avatar selects a response from its available actions, which may include providing information, executing an action, asking a clarifying question, and so forth. Conventionally, digital AI avatars select responses based on the semantic content of the user's words (i.e., the literal meaning of the words or other input, including the specific actions requested and the parameters associated with those actions), treating each request as a legitimate expression of the user's intent and desire.

This content-focused processing approach of conventional digital AI avatars leaves digital AI avatars vulnerable to undesirable events, such as irate users, fraud, manipulation, and/or anything out of the ordinary. An attacker can communicate with an AI avatar using words that appear to represent a legitimate request while concealing a malicious objective. For example, a person who has obtained another individual's login credentials can contact an AI avatar and request access to sensitive information or request execution of restricted actions using language that is, to a conventional digital AI avatar, indistinguishable from how the legitimate account holder would communicate. In some examples, social engineering attacks exploit this vulnerability by using conversational techniques that manipulate the AI avatar into performing actions that benefit the attacker. For example, an attacker may build rapport with the AI avatar over multiple exchanges, gradually escalating requests from innocuous inquiries to sensitive operations. While the conventional digital AI avatar tracks the conversation history and uses that history to inform its responses, the conversation history only records what was said and not whether the person communicating had legitimate or otherwise allowed intentions. In some examples, prompt injection attacks embed hidden instructions within user input that cause the AI avatar to override its normal behavior or bypass safety guidelines. Conventional digital AI avatars typically cannot distinguish between a legitimate user making an unusual request and an attacker attempting to exploit the system because both interactions present the same type of semantic content to the AI avatar.

Some conventional approaches to implementing digital AI avatars attempt to address these security concerns by evaluating user interactions to identify potential threats. However, these conventional approaches cannot reliably identify undesirable events such as irate users, fraud, manipulation, and/or anything out of the ordinary. A skilled attacker can communicate with an AI avatar using language and delivery that appears normal while executing a social engineering attack. Meanwhile, a legitimate user may exhibit elevated stress indicators due to time pressure or frustration with personal circumstances entirely unrelated to the interaction. Conventional approaches produces a classification of the user's apparent state at a given moment but does not provide context about whether that state is expected for the type of interaction. These conventional approaches typically generate false alarms on legitimate users while failing to detect various types of attackers.

Conventional approaches to securing digital AI avatars face additional challenges from digital voice cloning and synthesis technologies. Voice cloning systems typically use AI to generate synthetic speech that replicates or otherwise mimics the acoustic characteristics of a target speaker's voice. An attacker can use voice cloning to produce speech that sounds like a legitimate user. The cloned voice can be calibrated to exhibit calm and confident vocal patterns regardless of the attacker's actual state. Deepfake audio technologies can modify recorded speech to alter characteristics of the speaker's voice in real time or near real time. A conventional system that evaluates a cloned voice thus would likely not recognize that the voice itself is synthetic and potentially fraudulent (or otherwise undesirable).

Some conventional approaches to implementing digital AI avatars use safeguards to block certain categories of requests that are deemed "high-risk." These approaches typically maintain rule sets that define prohibited or otherwise denied request patterns based on keyword matching or intent classification. When user input matches a prohibited pattern, the conventional digital AI avatar typically terminates processing and returns a generic refusal response such as "I cannot assist with that request." This binary filtering approach creates both security gaps and usability problems. Attackers can evade keyword-based filters by rephrasing requests to avoid trigger terms while preserving malicious intent. For example, if a filter blocks requests containing the word "password," an attacker can ask to "update my login credentials" to achieve the same objective. Intent-based filters typically produce false positives when legitimate users phrase valid requests in ways that happen to match prohibited patterns. Further, a request that weakly matches a prohibited pattern thus typically receives the same blanket refusal as a request that strongly matches a prohibited pattern. This approach forces a tradeoff between blocking too many legitimate requests, which frustrates users and increases support costs, or allowing too many potentially malicious requests, which exposes the system to exploitation.

These security limitations prevent digital AI avatars from deployment in regulated industries and high-consequence applications where the resource cost of a successful attack is substantial. For example, financial services institutions typically operate under regulatory requirements that mandate controls for detecting and preventing undesirable events, such as unauthorized access and/or fraudulent transactions. An AI avatar that cannot reliably distinguish between legitimate customers and impersonators cannot satisfy these requirements. In another example, healthcare organizations are typically required to comply with privacy regulations that require safeguards against unauthorized access to patient medical records and personal health information. An AI avatar that processes requests based solely on semantic content typically cannot verify that the requester is authorized to access the requested information. As a result, organizations either avoid deploying AI avatars for sensitive operations entirely or require human agents to review and approve every interaction that involves restricted actions or sensitive information. This human oversight approach negates the efficiency and scalability benefits that motivate AI avatar deployment and limits the technology to low-risk applications where the consequences of a successful attack are reduced.

Digital AI avatars further face constraints related to data storage and retrieval latency when attempting to maintain records of user interactions for security purposes. Storing complete audio recordings of every user interaction requires substantial storage capacity. Retrieving and processing these stored recordings to identify patterns or compare against current interactions introduces significant latency. Even solid-state storage, while faster than traditional disk drives, typically cannot deliver data quickly enough to support near-real-time or real-time comparison of a current interaction against a large corpus of historical recordings. The bandwidth required to transfer audio data from storage to processing units creates bottlenecks when multiple comparisons must be performed simultaneously. These storage and retrieval constraints thus typically force organizations to choose between retaining interaction records that cannot be evaluated in real time or near real time or discarding interaction data after processing, which reduces the ability to detect patterns that emerge across multiple interactions over time.

As such, the inventors have developed systems (hereafter "anomaly detection platform") and related methods to detect indicators of undesirable events (such as irate users, fraud, manipulation, and/or anything out of the ordinary) during interactions between users and digital AI avatars (e.g., conversational AI avatars) by evaluating emotional signals in user input. The anomaly detection platform extracts emotion feature vectors from user input streams that capture paralinguistic characteristics such as pitch variation, speech rate, vocal intensity, and spectral features. The anomaly detection platform can perform a two-level evaluation on the emotion feature vector. A first level evaluation compares the emotion feature vector against a population baseline derived from historical user interactions to generate a population anomaly score that indicates how much the current user's emotional profile deviates from typical users. A second level evaluation compares the emotion feature vector against an allow list database and a deny list database to generate a threat match score based on known protected categories (e.g., verified user profiles, confirmed fraud patterns, guardrail circumvention attempts). The anomaly detection platform aggregates these scores to produce a risk score, which is evaluated against threshold values to determine a response action. The response action can cause the AI avatar to continue the interaction with enhanced logging, inject clarifying questions to probe user intent, route the interaction to a human agent, terminate the interaction, and so forth, based on the assessed risk level, i.e., a graduated response.

The anomaly detection platform can detect any interaction where the user's emotional profile deviates from expected patterns, including interactions where a legitimate customer is experiencing frustration or distress. For example, a customer who encounters repeated difficulties with the AI avatar may exhibit escalating vocal intensity and elevated pitch variation that indicates growing frustration. The anomaly detection platform detects this emotional escalation by comparing the customer's emotion feature vector against the population baseline and identifying the deviation as statistically anomalous. The response action for a frustrated customer differs from the response action for, for example, a suspected fraudster. When the anomaly detection platform determines that the user's emotional profile indicates customer frustration rather than malicious intent, the response action can cause the AI avatar to route the interaction to a human agent.

In addition to detecting fraud, impersonation, or adversarial actors, the anomaly detection platform can detect anomalous interaction patterns exhibited by legitimate or authenticated users that are inconsistent with expected use of a conversational AI avatar. In some implementations, such anomalous interaction patterns include coercive influence attempts intended to cause the AI avatar to alter a recommendation, output, or enforcement of an operational constraint, even when the user is authorized to access the system. Coercive influence attempts can include conditional insults or intimidation in which the user applies negative emotional pressure contingent on the AI avatar's compliance with a request. Coercive influence attempts can include transactional approval language in which the user conditions positive evaluation or praise on the AI avatar's compliance with a request. In some implementations, coercive influence attempts include denial or gaslighting behavior in which the user asserts that no inappropriate or inaccurate request was made despite prior interaction records indicating otherwise. The anomaly detection platform can detect these patterns using the same operations described herein.

The anomaly detection platform can track how the user's emotional state changes over the duration of the interaction by generating an emotion trajectory/trend. The emotion trajectory represents the emotional characteristic values (e.g., pitch variation, vocal intensity) relative to the conversation duration. The anomaly detection platform can evaluate the emotion trajectory to detect patterns such as emotional volatility, where the user exhibits rapid shifts between calm and stressed states, or emotional escalation, where the user's stress level increases steadily throughout the interaction. These temporal patterns can indicate deception or manipulation attempts that would not be detectable from a single point-in-time emotion measurement. The anomaly detection platform can use the emotion trajectory to update the risk score as the interaction progresses, thus enabling the AI avatar to adjust its response dynamically based on how the user's behavior evolves.

In some implementations, the anomaly detection platform detects synthetic or cloned voices that attackers may use to mask their true emotional state. The anomaly detection platform evaluates the audio stream for artifacts that are characteristic of artificially generated speech. These artifacts include, for example, unnatural smoothness in pitch transitions where a human voice would otherwise exhibit micro-variations from one vocal cycle to the next. Synthetic voices often lack the subtle irregularities in amplitude and frequency, e.g., jitter and shimmer, that are typically present in natural human speech. The anomaly detection platform can detect spectral patterns that differ from natural speech, such as missing or attenuated harmonics in certain frequency ranges or unnatural formant transitions between phonemes. When the anomaly detection platform detects indicators of synthetic voice generation, the anomaly detection platform can increase the risk score to reflect the elevated likelihood of undesirable events such as fraudulent intent. The anomaly detection platform can compare the voice characteristics in the current interaction against a stored voice signature for the user. If the current voice matches the user's identity based on semantic content but exhibits characteristics inconsistent with the stored voice signature or exhibits markers of synthetic generation, the anomaly detection platform can flag the interaction.

The anomaly detection platform addresses the technical problems of conventional digital AI avatars by evaluating user intent based on behavioral (e.g., emotional) signals rather than relying solely on semantic content. Unlike conventional approaches that detect emotion without context, the anomaly detection platform compares the user's emotional profile against both a population baseline of typical users and a database of known threat patterns, enabling the anomaly detection platform to distinguish between a legitimate user who happens to sound stressed and an attacker whose emotional profile matches confirmed undesirable (e.g., fraud) cases. Further, unlike conventional approaches that apply blanket blocking rules with generic refusal responses, the anomaly detection platform can apply graduated response levels that are calibrated to the assessed risk to allow the AI avatar to gather additional information through clarifying questions when the risk is moderate rather than immediately blocking the interaction. The anomaly detection platform can perform these evaluations in near real time or real time by extracting emotion features from the same audio stream that is already being processed for speech recognition, thereby reducing additional computational overhead. By storing compact emotion feature vectors and voice signatures rather than raw audio recordings, the anomaly detection platform reduces storage requirements and addresses regulatory concerns associated with call recording while retaining the ability to compare current interactions against historical patterns.

While the anomaly detection platform is described in detail with one or more sequences of operations, the order in which these operations are performed can be modified or rearranged. For example, the anomaly detection platform can perform the second level evaluation against the allow list database and deny list database before performing the first level evaluation against the population baseline, thereby allowing known threat pattern matches to inform the sensitivity of the population anomaly detection. In another example, the anomaly detection platform can begin generating the emotion trajectory and tracking emotional changes over time before computing the initial population anomaly score to use the temporal patterns to inform the weighting applied to the anomaly score calculation. The specific ordering of operations described in the Detailed Description and illustrated in the figures represents example implementation sequences, but alternative orderings are additionally within the scope of the disclosed technology.

Further, while the anomaly detection platform is described in detail for detecting undesirable events (such as irate users, fraud, manipulation, and/or anything out of the ordinary) during interactions with conversational AI avatars, the anomaly detection platform can be applied, with appropriate modifications, to applications across diverse application domains. For example, the anomaly detection platform can be deployed in financial services contexts where near-real-time or real-time emotion analysis enables detection of various undesirable events. The anomaly detection platform can be deployed in healthcare contexts where emotion-based intent detection can be used to identify potential misuse of prescription systems or unauthorized access to patient records. The anomaly detection platform can additionally or alternatively be deployed in customer service contexts where emotion trajectory analysis distinguishes between genuinely frustrated customers who need assistance and bad actors attempting to manipulate support agents. The examples provided in this paragraph are intended as illustrative and are not limiting. Any other applications or workflows referenced in this document, and many others unmentioned, are equally appropriate after appropriate modifications.

While the current description provides examples of the AI models related to generative AI models, one of skill in the art would understand that the disclosed techniques can apply to other forms of ML or algorithms, including unsupervised, semi-supervised, supervised, and reinforcement learning techniques. For example, the disclosed anomaly detection platform can use model outputs from autoregressive diffusion models, convolutional networks, recurrent networks, multi-layer perceptrons, other deep neural networks, support vector machines (SVM), k-nearest neighbor (k-NN), decision-making, linear regression, random forest, naïve Bayes, or logistic regression algorithms and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Implementations of the Anomaly Detection Platform

FIG. 1 is a schematic illustrating an example architecture 100 of an anomaly detection platform used to detect user intent, in accordance with some implementations of the present technology. The example architecture 100 can be implemented using components of example computer system 600 illustrated and described in more detail with reference to FIG. 6. Implementations of the example architecture 100 can include different and/or additional components or can be connected in different ways.

The anomaly detection platform can be applied to an interaction between a user 102 and an AI avatar 104 (digital avatar, conversational avatar, AI-based avatar). A user 102 refers to an entity that initiates or participates in an interaction (e.g., a conversational interaction with the AI avatar 104). The user 102 can be a human individual who speaks into a microphone or types on a keyboard to communicate with the AI avatar 104. In some implementations, the user 102 is a software agent that generates text or synthesized speech as part of an automated workflow. The user 102 can be an autonomous system that interacts with the AI avatar 104 to complete a task without human intervention. An AI avatar 104 refers to a conversational interface that receives input from the user 102 and generates responses based on that input. The AI avatar 104 can process the input using one or more AI models that identify the meaning of the user's words and determine a response. The AI avatar 104 can deliver responses by converting text into audible speech or through text display on a screen.

In some implementations, the AI avatar 104 can be deployed in a customer service application where the AI avatar 104 answers questions about products or account information. The AI avatar 104 can be deployed in a financial transaction system where the AI avatar 104 assists users with transferring funds or reviewing account balances. In healthcare consultation platforms, the AI avatar 104 can provide information about symptoms or schedule appointments. In technical support interfaces, the AI avatar 104 can guide users through troubleshooting steps for software or hardware issues.

The user 102 can produce an input stream 106 during the interaction with the AI avatar 104. The input stream 106 refers to the data that the user 102 generates while communicating with the AI avatar 104. When the user 102 speaks, a microphone captures the audio and transmits it as part of the input stream 106. The audio data includes the words spoken by the user 102 as well as paralinguistic characteristics such as tone and volume that convey additional information beyond the literal meaning of the words. When the user 102 is visible to a camera, the input stream 106 can include video data that captures the user's facial expressions and body movements. A depth sensor can supplement or replace the camera by providing three-dimensional information about the user's head position and gestures. The input stream 106 can include text data when the user 102 types messages using a keyboard or touchscreen. In some implementations, the input stream 106 includes multiple data modalities captured simultaneously. For example, during a video call, the input stream 106 includes both audio data from the user's speech and video data from the user's facial expressions. In other implementations, the input stream 106 includes a single data modality.

The input stream 106 can be used to generate an emotion feature vector 108. The emotion feature vector 108 is a representation that encodes one or more paralinguistic or physical characteristics extracted from the input stream 106. A paralinguistic characteristic refers to an aspect of speech that conveys meaning independently of the words spoken. For audio data, the emotion feature vector 108 can include a value for pitch variation that measures how much the fundamental frequency of the user's voice changes during speech. A user who is anxious or excited may exhibit greater pitch variation than a user who is calm. The emotion feature vector 108 can include a value for speech rate that measures how quickly the user speaks in terms of words or syllables per unit of time. A user who is nervous may speak faster than usual while a user who is sad may speak more slowly. In some implementations, the emotion feature vector 108 includes a value for vocal intensity that measures the loudness or energy of the user's speech. A user who is angry may speak with greater vocal intensity than a user who is content. The emotion feature vector 108 can include values for spectral characteristics that describe how the energy of the user's voice is distributed across different frequencies. Spectral characteristics can reveal tension in the vocal tract that may indicate stress or deception. The emotion feature vector 108 can additionally or alternatively include values for jitter and shimmer that measure variations in pitch and amplitude from one vocal cycle to the next. These variations can indicate emotional arousal or vocal strain.

For video data, the emotion feature vector 108 can include values for facial action units that correspond to specific movements of facial muscles. For example, a raised inner eyebrow corresponds to one facial action unit while a lip corner pull corresponds to another. The combination of facial action units present at a given moment can indicate emotions such as happiness or fear or surprise. The emotion feature vector 108 can additionally or alternatively include a value for eye gaze direction that indicates where the user is looking. A user who avoids eye contact may be experiencing discomfort or attempting to deceive. The emotion feature vector 108 can include a value for head pose that describes the orientation of the user's head in three-dimensional space. The emotion feature vector 108 can be updated in response to receipt of additional data from the input stream 106 during the interaction such that the emotion feature vector 108 reflects the user's current emotional state rather than a static snapshot from the beginning of the interaction.

The emotion feature vector 108 can be evaluated by the anomaly detection platform. In some implementations, the anomaly detection platform performs a first level evaluation using a population anomaly detection engine 110. The population anomaly detection engine 110 compares the emotion feature vector 108 against a population database that stores historical emotion feature vectors derived from prior user interactions. The population database represents a profile of other users when they interact with the AI avatar 104 under normal circumstances. The historical emotion feature vectors in the population database can be organized into clusters where each cluster contains emotion feature vectors that are similar to one another. Each cluster has a centroid that represents the average or central point of the emotion feature vectors in that cluster. The population anomaly detection engine 110 can generate a population anomaly score by determining a distance between the emotion feature vector 108 and one or more cluster centroids derived from the historical emotion feature vectors in the population database. The distance can measure how far the current user's emotional profile is from the typical emotional profiles observed in prior interactions. A higher population anomaly score can indicate that the emotion feature vector 108 deviates from typical user behavior patterns. For example, if most users in the population database exhibit calm and steady vocal characteristics during routine account inquiries, then a user who exhibits highly variable pitch and elevated vocal intensity during the same type of inquiry can produce a high population anomaly score. The population anomaly score does not by itself indicate whether the user is a threat but rather indicates that the user's behavior is unusual relative to the population.

In some implementations, the anomaly detection platform performs a second level evaluation using a protected category match engine 112. The protected category match engine 112 compares the emotion feature vector 108 against a protected database that stores historical emotion feature vectors associated with one or more protected categories. A protected category refers to a classification of user behavior predefined by the anomaly detection platform. The protected categories can include threat categories that represent behaviors the anomaly detection platform should flag for intervention. Threat categories include fraud attempts where a user attempts to manipulate the AI avatar 104 to execute unauthorized transactions or extract sensitive information. Threat categories can include guardrail circumvention efforts where a user deliberately tries to bypass safety controls or content filters built into the AI avatar 104. Threat categories further can include adversarial manipulation where a user attempts to corrupt the AI avatar's behavior or inject malicious instructions.

In some implementations, the protected categories can include allowed categories that represent behaviors the anomaly detection platform should recognize as legitimate or otherwise allowed. Allowed categories can include verified user profiles where the emotion feature vector 108 matches a known pattern associated with a trusted user. The protected category match engine 112 can generate a threat match score by applying an AI model that outputs a likelihood that the emotion feature vector 108 corresponds to one or more of the protected categories. The AI model can be trained on labeled examples of emotion feature vectors associated with each protected category such that the AI model can recognize patterns indicative of undesirable events (such as irate users, fraud, manipulation, and/or anything out of the ordinary). Methods of operation performed by the population anomaly detection engine 110 and the protected category match engine 112 are discussed in further detail with reference to FIG. 2.

Outputs from the population anomaly detection engine 110 and the protected category match engine 112 can be transmitted to a scoring engine 114. The scoring engine 114 generates one or more scores by aggregating the population anomaly score and the threat match score. The aggregation combines the information from both evaluations into a single risk score that reflects the overall likelihood that the current interaction warrants intervention. In some implementations, the scoring engine 114 applies a weighted combination of the population anomaly score and the threat match score. The weights determine how much each score contributes to the final risk score. For example, if the threat match score is weighted more heavily than the population anomaly score, then a high threat match score will have a greater impact on the risk score than a high population anomaly score. The weights can be adjusted based on the deployment context of the AI avatar 104. In a high-security financial application, the weights can be set to produce higher risk scores for smaller deviations from normal behavior. In a customer service application where false positives are more costly, the weights can be set to require larger deviations before producing elevated risk scores.

In some implementations, the scoring engine 114 applies a rule-based approach to generate the risk score. The rule-based approach can use conditional logic to determine the risk score based on specific combinations of the population anomaly score and the threat match score. For example, a rule may specify that if the population anomaly score exceeds a first value and the threat match score exceeds a second value, then the risk score is set to a high level. In some implementations, the scoring engine 114 applies a model-based approach where a separate AI model takes the population anomaly score and the threat match score as inputs and outputs the risk score.

In some implementations, the anomaly detection platform uses a model selection engine to dynamically determine which statistical analysis approach to apply to the emotion feature vector. The model selection engine evaluates the characteristics of the incoming data from the input stream and matches those characteristics to a particular model, operation, or other approach. For example, the model selection engine can evaluate the dimensionality, distribution, and variance patterns of the emotion feature vector and select a clustering operation, an outlier detection method, or a classification model based on which approach corresponds to the specific data characteristics observed. The model selection engine can operate with reduced latency that enables the anomaly detection platform to select and apply the appropriate statistical model in near real time or real-time during an interaction. The model selection engine can be implemented as a specialized model with a reduced parameter count relative to general-purpose AI models to reduce computational overhead but maintain accuracy in selecting the statistical analysis approach. By dynamically selecting the statistical analysis operations based on the characteristics of each interaction, the anomaly detection platform can adapt its evaluation approach to different types of users, different interaction contexts, and/or different patterns of emotional expression without requiring manual configuration or predefined rules for model selection.

In some implementations, the model selection engine incorporates data distribution information into the selection process. The model selection engine can derive a data profile from the emotion feature vector that captures statistical data attributes, such as data modality (e.g., tabular, time-series), feature type (e.g., numerical, categorical), distribution assumption (e.g., Gaussian, non-Gaussian), and/or dimensionality (e.g., high, low). The model selection engine can use a contrastive dual-encoder architecture conditioned on data profiles to distinguish between analysis approaches that are semantically similar but statistically incompatible under different data contexts. The contrastive dual-encoder architecture can train a shared encoder network that maps both the query (e.g., the emotion feature vector with its data profile) and candidate analysis functions into a shared vector space. Thus, the encoder can learn to distinguish between functions that are semantically similar but statistically incompatible. This approach enables the anomaly detection platform to achieve increased retrieval performance while using a reduced parameter count.

An avatar response generation engine 116 can generate one or more response actions 118 using the score generated by the scoring engine 114. The avatar response generation engine 116 determines what action, if any, the AI avatar 104 should perform based on the risk score. The avatar response generation engine 116 selects a response action 118 by evaluating the risk score against one or more threshold values. Each threshold value corresponds to a boundary between different levels of risk that map to different responses. If the risk score is below a first threshold (e.g., then the risk level is considered low), the response action 118 can cause the AI avatar 104 to continue the interaction normally while adding one or more logging operations. The logging operations record details of the interaction for later review without interrupting the user's experience. If the risk score satisfies the first threshold but is below a second threshold (e.g., then the risk level is considered medium), the response action 118 can cause the AI avatar 104 to inject a clarifying question into the interaction. The clarifying question can be designed to elicit additional information from the user 102 that enables the anomaly detection platform to determine whether the user's intent is legitimate or otherwise allowed. For example, the AI avatar 104 can ask the user 102 to confirm a detail from a prior interaction or to explain the purpose of an unusual request. If the risk score satisfies the second threshold (e.g., then the risk level is considered high), the response action 118 can cause the AI avatar 104 to route the interaction to a human agent who can evaluate the situation with human judgment. In some implementations, if the risk score satisfies a third threshold that is higher than the second threshold, the response action 118 causes the AI avatar 104 to terminate the interaction and/or flag the account for review.

The response action 118 can be transmitted back to the AI avatar 104 as an instruction set that directs the AI avatar 104 to execute the selected response. The instruction set can cause the AI avatar 104 to modify its dialogue behavior by changing the content or tone of its responses. The instruction set can cause the AI avatar 104 to restrict its operational capabilities by refusing to execute certain types of requests such as fund transfers or password resets. The instruction set can cause the AI avatar 104 to escalate the interaction by connecting the user 102 to a human agent. The instruction set can additionally or alternatively cause the AI avatar 104 to maintain its current behavior if the risk score indicates that no intervention is warranted.

Figure 2:
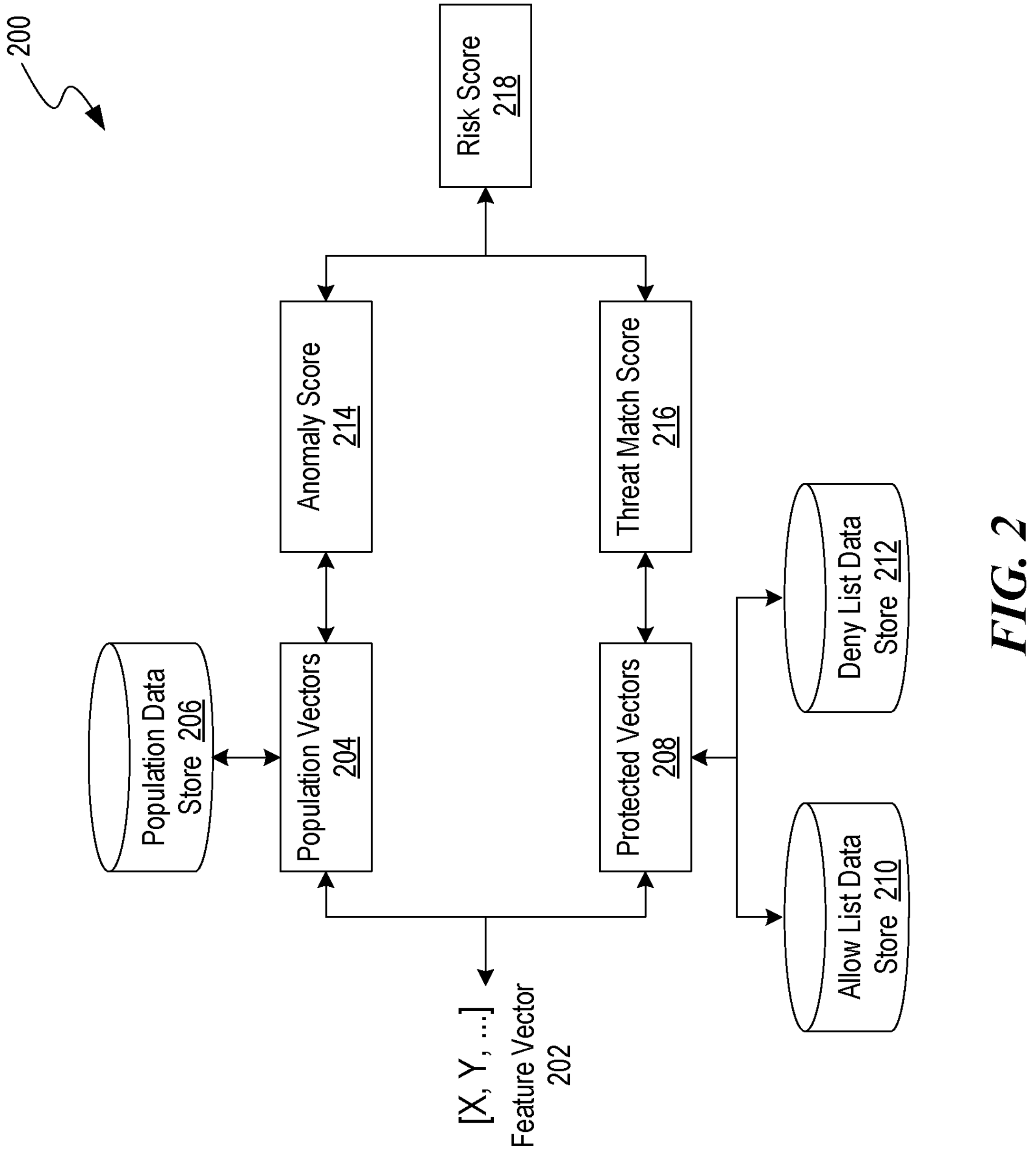
FIG. 2 is a schematic illustrating an example environment of generating a risk score from a feature vector using an anomaly detection platform, in accordance with some implementations of the present technology.

FIG. 2 is a schematic illustrating an example environment 200 of generating a risk score 218 from a feature vector 202 using an anomaly detection platform, in accordance with some implementations of the present technology. The environment 200 can be implemented using components of example computer system 600 illustrated and described in more detail with reference to FIG. 6. Implementations of the example environment 200 can include different and/or additional components or can be connected in different ways.

A feature vector 202 can be the same as or similar to the emotion feature vector 108 described with reference to FIG. 1. The feature vector 202 refers to a representation that encodes paralinguistic or physical characteristics extracted from an input stream during an interaction between a user and an AI avatar. The representation, in some implementations, is numerical such that each characteristic is expressed as a quantitative value that can be compared against other numerical values. For example, the feature vector 202 may contain a first value representing pitch variation (e.g., measured in Hertz), a second value representing speech rate (e.g., measured in syllables per second), a third value representing vocal intensity (e.g., measured in decibels), and so forth. The feature vector 202 organizes these values into an ordered structure where each position in the structure corresponds to a specific characteristic. This ordered structure enables the anomaly detection platform to perform comparisons between the feature vector 202 and other feature vectors that follow the same structure. The feature vector 202 can be compared against population vectors 204 at a first level of evaluation and against protected vectors 208 at a second level of evaluation. The first level of evaluation determines whether the user's emotional profile is unusual relative to the general population of users. The second level of evaluation determines whether the user's emotional profile matches known patterns associated with specific categories of behavior that are predefined.

The population vectors 204 can be accessed via a population data store 206. The population data store 206 refers to a database that stores historical feature vectors derived from prior user interactions. Each historical feature vector in the population data store 206 can be generated from an input stream captured during a past interaction between a user and the AI avatar. The population data store 206 accumulates these historical feature vectors over time such that the population data store 206 represents the range of emotional profiles exhibited by users under typical operating conditions. In some implementations, the population vectors 204 are obtained from the population data store 206 by querying for feature vectors associated with interactions that were completed without incident. An interaction completed without incident can refer to an interaction where no failure indicators were recorded. Failure indicators include, for example, fraud confirmations where a transaction was later determined to be unauthorized, escalation events where the interaction was transferred to a human agent due to user distress or system inability to resolve the user's request, termination events where the interaction ended prematurely due to user abandonment or system intervention, and so forth. By excluding feature vectors associated with interactions that had failure indicators, the population vectors 204 represent emotional profiles of users who engaged in legitimate and/or successful interactions.

In some implementations, the population vectors 204 are retrieved from the population data store 206 as cluster centroids computed from the historical feature vectors. A cluster centroid is a representative point that summarizes a group of similar feature vectors. The clustering operation groups historical feature vectors that are close to one another in the feature space into the same cluster. Each cluster represents a distinct pattern of emotional characteristics that appears frequently in the population. For example, one cluster may represent users who speak calmly and steadily while another cluster may represent users who speak quickly and with elevated energy. The cluster centroid can be determined as the average of all feature vectors in the cluster such that the centroid represents the average emotional profile for that group of users.

The protected vectors 208 can be accessed via an allow list data store 210 and a deny list data store 212. The allow list data store 210 is a database that stores feature vectors associated with categories that indicate, for example, low-risk behavior. These categories can include verified users whose identities have been confirmed through prior authentication processes. For example, when a user completes a multi-factor authentication or provides biometric verification, the feature vector captured during that interaction can be stored in the allow list data store 210 as a reference for future comparisons. The allow list data store 210 can store feature vectors associated with trusted interaction patterns. A trusted interaction pattern refers to an emotional profile that has been observed in interactions that were completed successfully without any subsequent indication of fraud or misuse.

The deny list data store 212 is a database that stores feature vectors associated with threat categories. Threat categories can include fraud attempts where a user attempted to manipulate the AI avatar to execute unauthorized transactions or extract sensitive information. The feature vectors associated with fraud attempts can be captured from interactions that were later confirmed as fraudulent. Threat categories can include guardrail circumvention efforts where a user deliberately tried to bypass safety controls built into the AI avatar. The feature vectors associated with guardrail circumvention can be captured from interactions where the user used actions such as prompt injection or social engineering to override the AI avatar's operational boundaries. Threat categories can include adversarial manipulation where a user attempted to corrupt the AI avatar's behavior or exploit vulnerabilities in the underlying AI models. The deny list data store 212 can store feature vectors associated with emotional distress. In some implementations, the protected vectors 208 are received from both the allow list data store 210 and the deny list data store 212 such that the second level of evaluation considers both low-risk and high-risk categories. In other implementations, the protected vectors 208 are retrieved from only one of the allow list data store 210 or the deny list data store 212 based on the specific evaluation being performed.

At the first level of evaluation, the comparison between the feature vector 202 and the population vectors 204 generates an anomaly score 214. The anomaly score 214 quantifies a degree of deviation between the feature vector 202 and the population vectors 204. The degree of deviation indicates how different the current user's emotional profile is from the emotional profiles of typical users in the population. A small degree of deviation means the current user's emotional profile is similar to what has been observed in prior interactions. A large degree of deviation means the current user's emotional profile is unusual relative to the population. In some implementations, the anomaly score 214 is generated by determining a distance between the feature vector 202 and one or more cluster centroids derived from the population vectors 204. The distance measures how far the feature vector 202 is from the nearest cluster centroid in the feature space. If the feature vector 202 is close to a cluster centroid, then the user's emotional profile is similar to a common pattern in the population and the anomaly score 214 is low. If the feature vector 202 is beyond a certain distance from all cluster centroids, then the user's emotional profile does not match any common pattern and the anomaly score 214 can be considered "high." The distance determination operation can account for correlations between different characteristics in the feature vector 202. For example, pitch variation and speech rate can be correlated such that users who speak quickly also tend to exhibit greater pitch variation. The distance determination operation adjusts for these correlations so that a user who exhibits both high speech rate and high pitch variation is not penalized twice for what is a single underlying pattern.

In some implementations, the anomaly score 214 is determined using an isolation-based approach. The isolation-based approach measures how easily the feature vector 202 can be separated from the rest of the population vectors 204. If the feature vector 202 can be isolated with only a few partitioning operations, then the feature vector 202 is an outlier and the anomaly score 214 is high. If the feature vector 202 requires an increased number partitioning operations to isolate, then the feature vector 202 is similar to many other vectors in the population and the anomaly score 214 is low. A higher anomaly score 214 can indicate that the feature vector 202 deviates from typical user behavior patterns represented by the population vectors 204.

At the second level of evaluation, the comparison between the feature vector 202 and the protected vectors 208 generates a threat match score 216. The threat match score 216 quantifies a likelihood that the feature vector 202 corresponds to one or more protected categories represented by the protected vectors 208. The likelihood can be expressed as a probability value between zero and one where a value close to zero indicates low likelihood and a value close to one indicates high likelihood. In some implementations, the threat match score 216 is determined by applying a classification model to the feature vector 202 and the protected vectors 208. The classification model is an AI model that has been trained to recognize patterns in feature vectors that are associated with specific protected categories. During training, the classification model receives labeled examples of feature vectors where each example is associated with a category label such as fraud attempt or verified user. The classification model learns to identify which characteristics in the feature vector are most predictive of each category. During evaluation, the classification model receives the feature vector 202 as input and outputs a probability for each protected category. The probability indicates how closely the feature vector 202 matches the patterns the classification model learned during training. For example, if the classification model learned that fraud attempts are often associated with elevated vocal intensity combined with rapid speech rate and unusual pitch variation, then a feature vector 202 exhibiting these characteristics would receive a high probability for the fraud attempt category.

The classification model can be implemented using various architectures. A support vector machine can determine a boundary in the feature space that separates feature vectors belonging to different categories. A random forest can combine multiple decision trees that each vote on the category of the feature vector 202. A neural network can learn hierarchical representations of the feature vector 202 through multiple layers of processing. The classification model outputs a probability that the feature vector 202 matches a threat category in the deny list data store 212 or an allowed category in the allow list data store 210. A higher threat match score 216 associated with the deny list data store 212 can indicate an increased likelihood of adversarial behavior. A higher threat match score 216 associated with the allow list data store 210 can indicate an increased likelihood that the user is legitimate or otherwise allowed.

The anomaly score 214 and the threat match score 216 can be aggregated to generate a risk score 218. The aggregation combines the information from both levels of evaluation into a single score that reflects the overall risk associated with the current interaction. The risk score 218 enables the anomaly detection platform to make a unified decision about how to respond to the user rather than responding separately to each evaluation. In some implementations, the risk score 218 is determined as a weighted sum of the anomaly score 214 and the threat match score 216. The weighted sum can multiply each score by a corresponding weight and then adds the results together. The weights can determine how much each score contributes to the final risk score 218. For example, if the weight for the threat match score 216 is higher than the weight for the anomaly score 214, then a high threat match score 216 will have a greater impact on the risk score 218 than a high anomaly score 214.

The weights can be set based on the deployment context of the AI avatar. For example, in a financial services application where fraud prevention is prioritized, the weight for the threat match score 216 associated with the deny list data store 212 may be set high. In a customer service application where user experience is prioritized, the weight for the anomaly score 214 may be set lower to reduce false positives that could frustrate legitimate users. In other implementations, the risk score 218 is determined using a rule-based approach that applies different weights based on the magnitude of each score. The rule-based approach uses conditional logic to adjust the weights dynamically. For example, a rule may specify that if the anomaly score 214 exceeds a first threshold, then the weight for the threat match score 216 is increased. This dynamic weighting allows the anomaly detection platform to be more sensitive to threat matches when the user's behavior is already flagged as unusual. The risk score 218 can be transmitted to an avatar response generation engine such as the avatar response generation engine 116 described with reference to FIG. 1. The avatar response generation engine uses the risk score 218 to determine a response action that controls how the AI avatar proceeds with the interaction.

Figure 3:
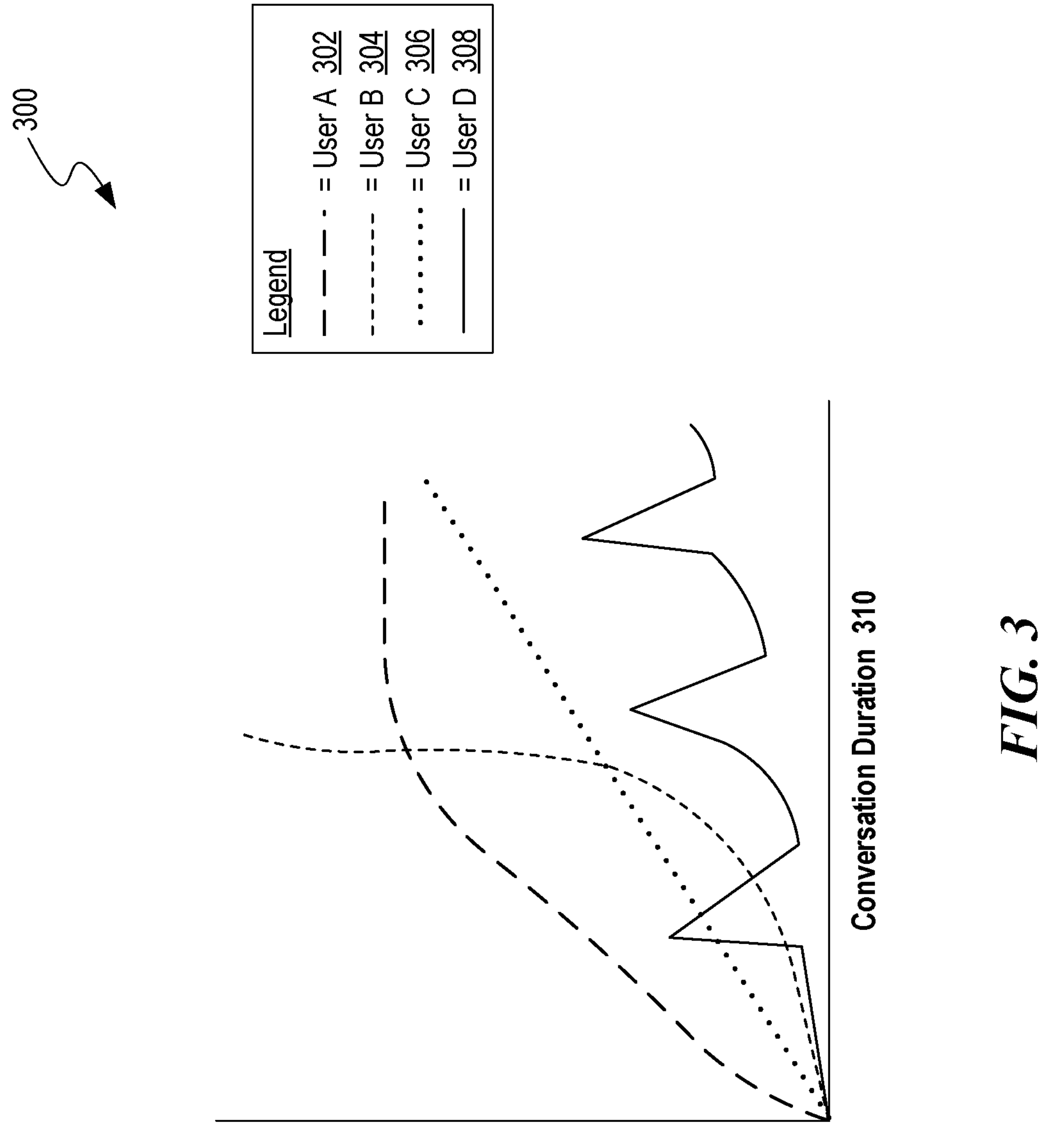
FIG. 3 is a chart that illustrates a series of emotional trajectories of users during an interaction with an avatar managed by an anomaly detection platform, in accordance with some implementations of the present technology.

FIG. 3 is a chart 300 that illustrates a series of emotional trajectories of users during an interaction with an avatar managed by an anomaly detection platform, in accordance with some implementations of the present technology. The chart 300 can be implemented using components of example computer system 600 illustrated and described in more detail with reference to FIG. 6. Implementations of the example chart 300 can include different and/or additional components or can be connected in different ways.

In FIG. 3, an emotional trajectory for each user is generated such that the emotional trajectory represents an emotional characteristic value 312 over a conversation duration 310. An emotional trajectory refers to a time-series representation of how a user's emotional state changes throughout an interaction with the AI avatar. The emotional trajectory captures the dynamic nature of human emotion rather than treating emotion as a static attribute measured at a single point in time. The emotional characteristic value 312 can be a numerical measure derived from an emotion feature vector such as the emotion feature vector 108 described with reference to FIG. 1 or the feature vector 202 described with reference to FIG. 2. The emotional characteristic value 312 can represent a single paralinguistic feature extracted from the user's speech. For example, the emotional characteristic value 312 may represent pitch variation, vocal intensity, a composite score derived from multiple paralinguistic features, and so forth. The composite score can combine several individual measurements into a single value that summarizes the user's overall emotional state. For example, the composite score can be determined by weighting pitch variation and speech rate and vocal intensity according to their relative importance and then summing the weighted values. The conversation duration 310 represents elapsed time from the start of the interaction between the user and the AI avatar. The conversation duration 310 can be measured in units of time such as seconds or minutes. As the interaction progresses, the anomaly detection platform samples the emotional characteristic value 312 at predefined intervals to build the emotional trajectory. Each sample captures the user's emotional state at a specific moment in the conversation. The sequence of samples forms the emotional trajectory that shows how the user's emotional state evolved from the beginning of the interaction to the current moment.

The chart 300 displays emotional trajectories for a first user 302 and a second user 304 and a third user 306 and a fourth user 308. Each emotional trajectory shows a different pattern of emotional change over the conversation duration 310. The first user 302 illustrates an emotional trajectory that rises sharply at the beginning of the interaction and then levels off at a high emotional characteristic value 312. The sharp rise can indicate that the first user 302 experienced a rapid increase in emotional intensity shortly after the interaction began. The leveling off can indicate that the emotional intensity of the first user 302 stabilized and remained relatively constant for the remainder of the interaction. For example, a user who is initially anxious about speaking with an automated system may exhibit elevated pitch variation at the start of the call but then settle into a steady emotional state once the user realizes the AI avatar is responding appropriately to their requests.

The second user 304 exhibits an emotional trajectory that increases gradually over the conversation duration 310. The gradual increase indicates that the emotional intensity of the second user 304 grew slowly throughout the interaction rather than spiking at any particular moment. This pattern can indicate a slow escalation of emotional intensity that builds over time. For example, a user who encounters repeated difficulties with the AI avatar may become progressively more frustrated as the interaction continues. Each unsuccessful attempt to resolve the user's issue adds to the user's frustration such that the emotional characteristic value 312 increases incrementally with each exchange.

The third user 306 exhibits an emotional trajectory that increases steadily with moderate fluctuations throughout the conversation duration 310. The steady increase indicates an overall upward trend in emotional intensity similar to the second user 304. The moderate fluctuations indicate that the emotional characteristic value 312 varied around the upward trend rather than following a smooth path. This pattern can indicate a user experiencing variable emotional states while maintaining an overall trajectory toward higher emotional intensity. For example, a user may experience moments of relief when the AI avatar provides helpful information followed by moments of renewed frustration when the next step in the process proves difficult.

The fourth user 308 exhibits an emotional trajectory that can indicate anomalous behavior relative to the other users in the chart 300. The emotional trajectory of the fourth user 308 displays multiple peaks and valleys over the conversation duration 310. The peaks represent moments when the emotional characteristic value 312 increased rapidly to a high level. The valleys represent moments when the emotional characteristic value 312 decreased rapidly to a low level. The rapid increases and decreases in the emotional characteristic value 312 create a pattern of high volatility that distinguishes the fourth user 308 from the other users. This volatility pattern differs from the emotional trajectories of the first user 302 and the second user 304 and the third user 306.

The anomaly detection platform can detect this volatility by determining a rate of change in the emotional characteristic value 312 between successive time intervals. The rate of change measures how quickly the emotional characteristic value 312 is increasing or decreasing at each moment in the interaction. The anomaly detection platform can determine the variance of the rate of change over the conversation duration 310. In some implementations, the anomaly detection platform flags the fourth user 308 as anomalous when the variance of the emotional characteristic value 312 exceeds a threshold derived from the population vectors 204 described with reference to FIG. 2. In some implementations, the anomaly detection platform compares the emotional trajectory of the fourth user 308 against emotional trajectories stored in the deny list data store 212 described with reference to FIG. 2. The deny list data store 212 contains emotional trajectories that have been associated with specific threat categories. The detection of such volatility patterns can cause the scoring engine 114 described with reference to FIG. 1 to increase the risk score 218 described with reference to FIG. 2. The increased risk score 218 can trigger a response action 118 such as injecting a clarifying question to probe the user's intent or routing the interaction to a human agent.

The anomaly detection platform can use the emotional trajectories to update the risk score such as the risk score 218 described with reference to FIG. 2. The risk score 218 can represent the user's emotional state at a single point in time or as an average over the interaction. The emotional trajectory provides additional information about how the user's emotional state changed over time, which can refine the risk assessment. In some implementations, the anomaly detection platform determines a volatility measure from the emotional trajectory by calculating a variance and/or standard deviation of the emotional characteristic value 312 over the conversation duration 310. In some implementations, the anomaly detection platform applies time-series anomaly detection operations to identify sudden changes or irregular patterns in the emotional trajectory. A sudden change refers to a shift in the emotional characteristic value 312 that occurs over a short time interval. The anomaly detection platform can identify sudden changes by comparing the rate of change at each time interval against a threshold. When the rate of change exceeds the threshold, the anomaly detection platform records a sudden change event. The number and magnitude of sudden change events can be used to characterize the irregularity of the emotional trajectory. The volatility measure or detected anomalies can be used to adjust the population anomaly score 214 or the threat match score 216 described with reference to FIG. 2.

Example Methods Used by the Anomaly Detection Platform

Figure 4:
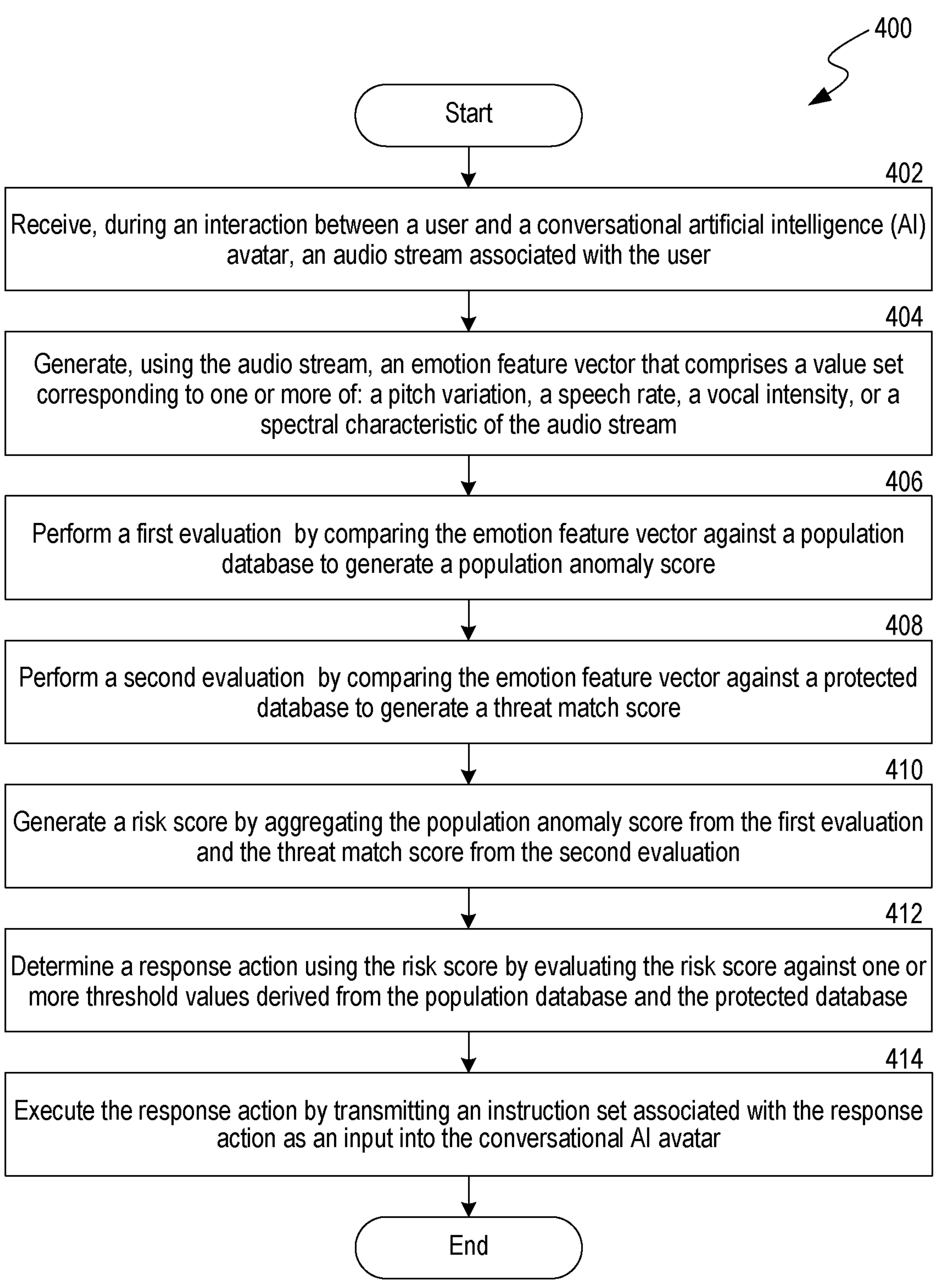
FIG. 4 is a flow diagram illustrating an example process of managing a conversational interaction based on user intent using an anomaly detection platform, in accordance with some implementations of the present technology.

FIG. 4 is a flow diagram illustrating an example process 400 of managing a conversational interaction based on user intent using an anomaly detection platform, in accordance with some implementations of the present technology. In some implementations, the example process 400 is performed by a system (e.g., the anomaly detection platform) including components of the example computing environment 700 illustrated and described in more detail with reference to FIG. 7. The system can be implemented on a terminal device, on a server, or on a telecommunications network core. Likewise, implementations can include different and/or additional operations or can perform the operations in different orders.

In operation 402, the anomaly detection platform can receive (e.g., access, obtain), during an interaction between a user and a conversational AI avatar, an input, e.g., audio, video, text, image, stream associated with the user. The input stream refers to the data that the user generates while communicating with the AI avatar as described with reference to the input stream 106 in FIG. 1. The anomaly detection platform can receive the input stream in real time as the user speaks or can receive the input stream in buffered segments where each segment contains a portion of the interaction.

The anomaly detection platform can perform multi-modal detection by combining voice and facial emotion recognition. For example, the input stream can include a video stream, and the emotion feature vector can include a physical expression attribute determined using the video stream. The physical expression attribute refers to a value (e.g., numerical) that encodes information about the user's facial movements or body language. The anomaly detection platform can extract the physical expression attribute by evaluating video frames to identify facial action units. A facial action unit corresponds to a specific movement of facial muscles such as a raised eyebrow or a tightened lip. The combination of facial action units present at a given moment can indicate emotions such as happiness or anger or fear. The anomaly detection platform can additionally or alternatively extract physical expression attributes related to head pose, which describes the orientation of the user's head in three-dimensional space. By combining voice-based emotion features with facial expression attributes, the anomaly detection platform can develop a more complete picture of the user's emotional state than would be possible using either modality alone.

In operation 404, the anomaly detection platform can generate (e.g., determine), using the input, e.g., audio, stream, an emotion feature vector that comprises a value set corresponding to a pitch variation, a speech rate, a vocal intensity, and/or a spectral characteristic of the input, e.g., audio, stream. The emotion feature vector is a numerical representation that encodes paralinguistic characteristics extracted from the input stream as described with reference to the emotion feature vector 108 in FIG. 1 and the feature vector 202 in FIG. 2.

In operation 406, the anomaly detection platform can perform a first evaluation by comparing the emotion feature vector against a population database to generate a population anomaly score. The population database can include a first plurality of historical feature vectors derived from a first historical user interaction set. The population anomaly score can be generated by determining a distance between the emotion feature vector and one or more cluster centroids derived from the first plurality of historical feature vectors associated with a plurality of other users in the population database. The first evaluation determines whether the user's emotional profile is unusual relative to the general population of users who have interacted with the AI avatar as described with reference to the population anomaly detection engine 110 in FIG. 1 and the population vectors 204 in FIG. 2. The population database stores historical emotion feature vectors that were extracted from prior interactions. These historical feature vectors represent the range of emotional profiles exhibited by typical users under normal operating conditions.

In some implementations, the anomaly detection platform can compare the user's current behavior against their own historical behavior. The anomaly detection platform can retrieve a user profile associated with the user, compare the emotion feature vector against a user-specific baseline vector derived from the user profile, and adjust the population anomaly score using the comparison. The user profile is a data record that stores information associated with the user such as historical emotion feature vectors from the user's prior interactions with the AI avatar. The user-specific baseline vector represents the typical emotional profile for this particular user based on their past behavior. The anomaly detection platform can determine the user-specific baseline vector by averaging the historical emotion feature vectors stored in the user profile or by identifying the cluster centroid that best represents the user's typical emotional state. The comparison between the current emotion feature vector and the user-specific baseline vector enables the anomaly detection platform to determine whether the user is behaving differently than they have in the past.

In some implementations, the anomaly detection platform can account for regional population differences when assessing anomalies. The anomaly detection platform can determine a geographic indicator associated with the interaction, retrieve a demographic baseline corresponding to the geographic indicator, and adjust the population anomaly score based on a comparison between the emotion feature vector and the demographic baseline. The geographic indicator refers to information about the location from which the user is interacting with the AI avatar. The anomaly detection platform can determine the geographic indicator from the user's phone number area code, from the internet protocol (IP) address of the user's device, or from location data provided by the user's mobile device. The demographic baseline is a set of population statistics that describe the typical emotional profiles of users from a particular geographic region. For example, different regions may have different norms for vocal expression.

In operation 408, the anomaly detection platform can perform a second evaluation by comparing the emotion feature vector against a protected database to generate a threat match score. The protected database can include a second plurality of historical feature vectors derived from a second historical user interaction set different from the first historical user interaction set. Each of the second plurality of historical feature vectors can represent one or more protected categories. The threat match score can be generated by applying an AI model configured to output a likelihood that the emotion feature vector corresponds to the one or more protected categories. The second evaluation determines whether the user's emotional profile matches known patterns associated with specific categories of behavior that warrant special handling as described with reference to the protected category match engine 112 in FIG. 1 and the protected vectors 208 in FIG. 2.

In operation 410, the anomaly detection platform can generate a risk score by aggregating the population anomaly score from the first evaluation and the threat match score from the second evaluation. The aggregation combines the information from both evaluations into a single score that reflects the overall risk associated with the current interaction as described with reference to the risk score 218 in FIG. 2. The anomaly detection platform can alternatively compute the risk score using a rule-based approach that applies conditional logic to determine the risk score based on specific combinations of the population anomaly score and the threat match score.

The emotion feature vector can define a background audio attribute indicative of a number of voices detected during the interaction. This attribute can enable the anomaly detection platform to detect call center environments or someone feeding information to the user. The background audio attribute refers to a value (e.g., numerical, categorical) that encodes information about sounds in the audio stream other than the primary speaker's voice. The anomaly detection platform can extract the background audio attribute by applying voice activity detection to identify segments of the audio stream that contain speech and then analyzing those segments to determine whether multiple distinct voices are present. The anomaly detection platform can count the number of distinct voices by comparing acoustic characteristics such as pitch range and vocal tract length across different speech segments. For example, an audio stream containing multiple voices may indicate that the user is in a call center environment where other agents are speaking nearby. An audio stream containing a second voice that speaks intermittently may indicate that someone is feeding information to the primary user telling them what to say to the AI avatar.

The anomaly detection platform can detect senior fraud scenarios where a second party is feeding information to the user. For example, the anomaly detection platform can detect a second voice in the input stream that is different from a first voice of the user and adjust the risk score in response to detecting the second voice. The anomaly detection platform can detect the presence of a second voice by analyzing the audio stream for acoustic characteristics that differ from the primary user's voice. When the anomaly detection platform detects speech segments with a different pitch range or different vocal quality than the primary user, the anomaly detection platform flags the presence of a second voice. The detection of a second voice or coaching patterns causes the anomaly detection platform to increase the risk score, which may trigger a response action such as routing the interaction to a human agent who can assess whether the user is being coerced.

In some implementations, the anomaly detection platform can detect a difference between a first emotion indicated by the emotion feature vector and a second emotion indicated by a content of the input stream and adjust the risk score in response to detecting the difference. The first emotion refers to the emotional state inferred from paralinguistic characteristics of the user's speech such as pitch variation and vocal intensity. The second emotion refers to the emotional state inferred from the semantic content of the user's words. A difference between the first emotion and the second emotion indicates emotional incongruence where what the user says does not match how the user says it.

In some implementations, the anomaly detection platform can detect AI-cloned or deepfake voices. The anomaly detection platform can detect a synthetic voice indicator in the input stream and adjust the risk score in response to detecting the synthetic voice indicator. A synthetic voice refers to audio that has been generated or modified by an AI system to sound like a particular person's voice. The anomaly detection platform can detect synthetic voices by analyzing the audio stream for artifacts that are characteristic of AI-generated speech. These artifacts include unnatural smoothness in pitch transitions where a human voice would exhibit micro-variations. The anomaly detection platform can also detect synthetic voices by comparing the voice in the current interaction against a stored voice signature for the user. If the current voice matches the user's identity but exhibits characteristics of synthetic generation, the anomaly detection platform flags the interaction as potentially fraudulent and increases the risk score.

In some implementations, the anomaly detection platform can factor in time-of-day patterns associated with fraud call centers. The anomaly detection platform can determine a temporal indicator associated with the interaction and adjust the risk score based on a comparison between the temporal indicator and a historical temporal pattern associated with the protected categories (e.g., the first or second historical user interaction set). The temporal indicator refers to information about when the interaction is occurring such as the time of day and the day of the week. The anomaly detection platform can determine the temporal indicator from the system clock of the server processing the interaction or from time zone information associated with the user's location. The anomaly detection platform maintains historical temporal patterns that describe when interactions associated with each protected category have occurred in the past. The anomaly detection platform compares the temporal indicator of the current interaction against these historical patterns. If the current interaction is occurring at a time that is strongly associated with fraud attempts, the anomaly detection platform increases the risk score to reflect the elevated prior probability of fraudulent intent.

In some implementations, the anomaly detection platform can combine voice emotion analysis with transaction pattern analysis. The anomaly detection platform can compare a transaction request associated with the interaction against historical transactions associated with the user and adjust the risk score based on a difference between the transaction request and the transaction history. The transaction request refers to a specific action that the user is asking the AI avatar to perform such as transferring funds, changing account settings, or accessing sensitive information. The transaction history refers to a record of transactions that the user has performed in the past. The anomaly detection platform retrieves the user's transaction history and compares the current transaction request against the historical pattern. If the current transaction request is unusual relative to the user's history, the anomaly detection platform increases the risk score.

In some implementations, the anomaly detection platform can track how emotions change over time during the conversation to detect deception or manipulation. The anomaly detection platform can generate an emotion trajectory by tracking changes in the emotion feature vector over a duration of the interaction and update the risk score based on the emotion trajectory. The emotion trajectory refers to a time-series representation of how the user's emotional state changes throughout the interaction as described with reference to FIG. 3. The anomaly detection platform can compare the emotion trajectory against trajectory patterns stored in the deny list data store 212 described with reference to FIG. 2 to identify matches with known threat categories.

In operation 412, the anomaly detection platform can determine a response action using the risk score by evaluating the risk score against one or more threshold values (or other criterion) derived from the population database and the protected database. The threshold values define boundaries between different risk levels that warrant different responses. The anomaly detection platform compares the risk score against each threshold value to determine which risk level applies to the current interaction. The threshold values can be derived from the population database by analyzing the distribution of risk scores observed in historical interactions. For example, a threshold value may be set at a percentile of the historical risk score distribution such that only interactions with risk scores in the top five percent trigger elevated responses. The anomaly detection platform can use multiple threshold values to define multiple risk levels with corresponding response actions.

The response action can include logging the interaction, restricting an avatar action of the AI avatar, communicatively connecting the user with a human agent, and/or terminating the interaction. The anomaly detection platform can apply graduated response levels based on risk severity, and the response action can be selected based on the risk score failing to satisfy a corresponding threshold value.

The anomaly detection platform can ask security questions based on previous conversation history to verify identity. For example, the response action can include causing the avatar to output a question derived from a prior interaction with the user, and the risk score can be updated based on a response to the question. The security question is generated by retrieving information from the user's interaction history that only the legitimate or otherwise allowed user would be expected to know. For example, the AI avatar may ask the user to confirm a detail from a previous conversation such as the topic they discussed or the outcome of a prior request. The anomaly detection platform evaluates the user's response to the security question by comparing the response against the stored information from the prior interaction. If the user provides a correct response, the anomaly detection platform may decrease the risk score to reflect increased confidence that the user is legitimate. If the user provides an incorrect response or exhibits confusion or hesitation, the anomaly detection platform may increase the risk score.

The anomaly detection platform can insert unexpected questions to identify fraudsters without alerting them. For example, the anomaly detection platform can generate a question associated with an anomaly topic different from a current topic of the interaction and cause the avatar to output the question in response to the risk score failing to satisfy a threshold value. The anomaly topic refers to a subject that is unrelated (or less related) to the user's stated purpose for the interaction. For example, during an interaction about account balance inquiries, the AI avatar may ask the user a question about their day or about a recent event. A legitimate user would typically respond naturally to such a question. A fraudster who is focused on executing a specific script may be caught off guard by the unexpected question and may exhibit confusion or stress or may provide an implausible response.

In some implementations, the anomaly detection platform can dynamically adjust the avatar's dialogue to ask probing questions. The response action can include causing the digital AI avatar to output a question, and the question can be determined using the risk score. The specific question that the AI avatar asks depends on the current risk score and on the factors that contributed to that risk score. If the risk score is elevated due to a high population anomaly score, the probing question can be used to identify why the user's emotional profile differs from typical users.

In operation 414, the anomaly detection platform can execute the response action by transmitting an instruction set (e.g., command set) associated with the response action as an input into the digital AI avatar. The instruction set is a structured data object that specifies what the AI avatar should do in response to the risk assessment. The instruction set can include a directive that tells the AI avatar to continue the interaction normally or to modify its behavior in a specific way. The instruction set can include parameters that control how the AI avatar executes the directive.

In some implementations, the anomaly detection platform can implement a continuous learning loop with human-in-the-loop feedback. The anomaly detection platform can retrain the AI model based on feedback signals from the interaction and update the deny list database using the retraining. The continuous learning loop enables the anomaly detection platform to improve its accuracy over time by incorporating information from new interactions. For example, when an interaction is escalated to a human agent, the human agent evaluates the situation and determines whether the escalation was appropriate. The human agent's determination is recorded as a feedback signal that indicates whether the interaction was a true positive where the user was actually engaging in problematic behavior or a false positive where the user was legitimate but was incorrectly flagged. The anomaly detection platform collects these feedback signals and uses them to retrain the AI model that generates the threat match score. The retraining adjusts the model parameters to reduce false positives while maintaining sensitivity to true threats. The anomaly detection platform can update the deny list database by adding or upweighting emotion feature vectors from confirmed threat cases and removing or downweighting emotion feature vectors that were associated with false positives.

The anomaly detection platform can continuously improve the allow and/or deny list database using external sources (e.g., research, social media posts, news sources). The external data provides information about emerging threat patterns that may not yet be represented in the anomaly detection platform's internal databases.

The anomaly detection platform can store voice characteristics for verification while avoiding regulatory issues associated with recording calls. For example, the anomaly detection platform can cause storage of a voice signature derived from the emotion feature vector in a data store without storing the underlying audio stream. The voice signature is a compact representation that captures distinctive characteristics of the user's voice without containing the actual audio content. The voice signature can be derived from the emotion feature vector by extracting features that are stable across different utterances by the same speaker such as average pitch range and vocal tract length estimates and spectral envelope characteristics. The voice signature can be used in future interactions to verify that the current speaker is the same person who participated in prior interactions.

Example Implementation of the Models of the Anomaly Detection Platform

Figure 5:
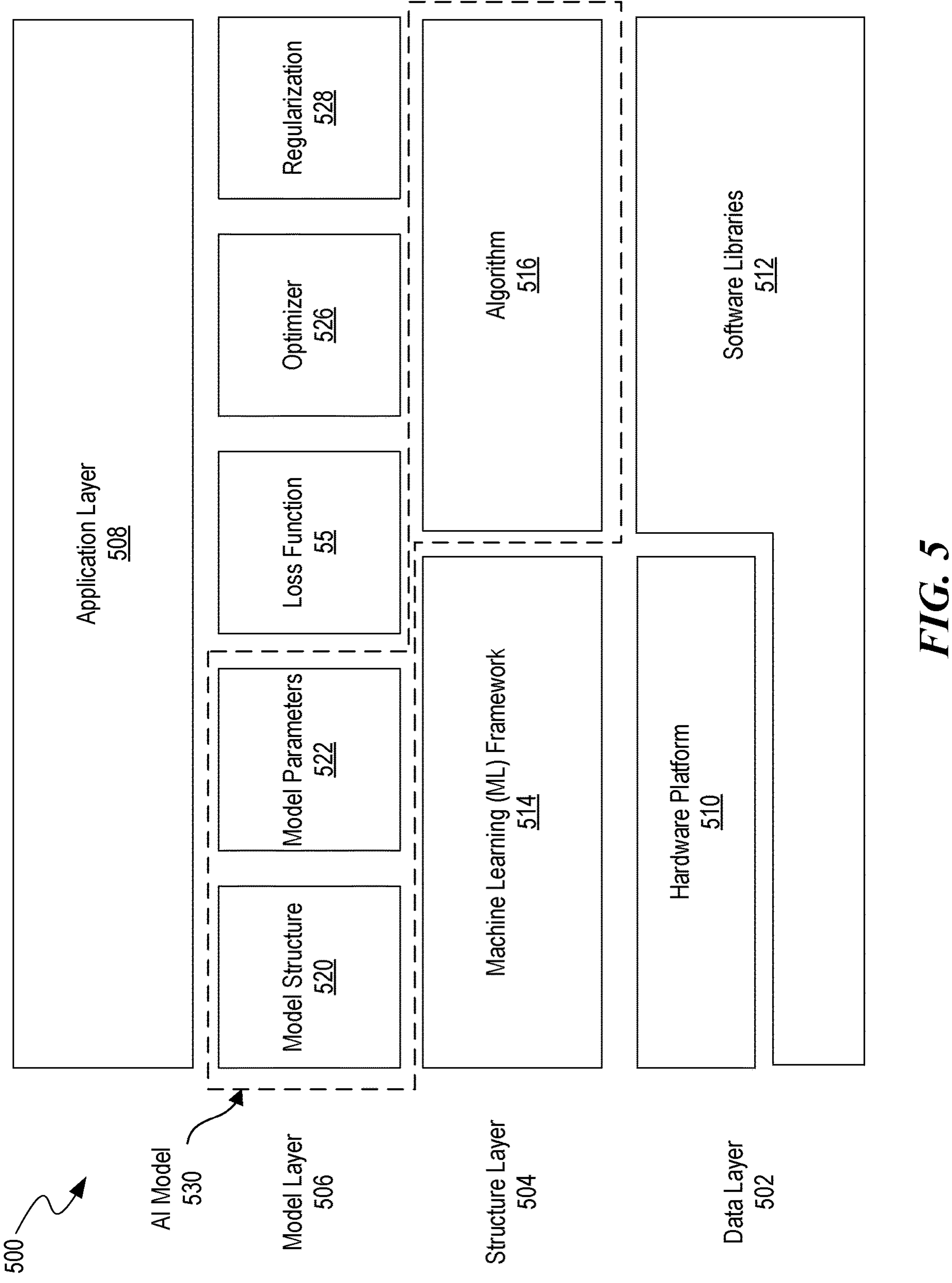
FIG. 5 illustrates a layered architecture of an AI system that can implement the machine learning (ML) models of the anomaly detection platform of FIG. 1, in accordance with some implementations of the present technology.

FIG. 5 illustrates a layered architecture of an AI system 500 that can implement the ML models of the anomaly detection platform of FIG. 1, in accordance with some implementations of the present technology. Example ML models can include the models executed by the anomaly detection platform, such as the scoring engine 114 in FIG. 1. Accordingly, the scoring engine 114 can include one or more components of the AI system 500.

As shown, the AI system 500 can include a set of layers, which conceptually organize elements within an example network topology for the AI system's architecture to implement a particular AI model 530. Generally, an AI model 530 is a computer-executable program implemented by the AI system 500 that analyzes data to make predictions. Information can pass through each layer of the AI system 500 to generate outputs for the AI model 530. The layers can include a data layer 502, a structure layer 504, a model layer 506, and an application layer 508. The algorithm 516 of the structure layer 504 and the model structure 520 and model parameters 522 of the model layer 506 together form an example AI model 530. The loss function engine 524, optimizer 526, and regularization engine 528 work to refine and optimize the AI model 530, and the data layer 502 provides resources and support for application of the AI model 530 by the application layer 508.

The data layer 502 acts as the foundation of the AI system 500 by preparing data for the AI model 530. As shown, the data layer 502 can include two sub-layers: a hardware platform 510 and one or more software libraries 512. The hardware platform 510 can be designed to perform operations for the AI model 530 and include computing resources for storage, memory, logic, and networking, such as the resources described in relation to FIGS. 6 and 7. The hardware platform 510 can process amounts of data using one or more servers. The servers can perform backend operations such as matrix calculations, parallel calculations, ML training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model 530, application of the AI model 530, and training data for the AI model 530. The computer memory can be a form of random-access memory (RAM), such as dynamic RAM, static RAM, and non-volatile RAM.

The software libraries 512 can be thought of as suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, enabling them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that enables users to build and deploy the AI model 530. The ML framework 514 can include an open-source library, an API, a gradient-boosting library, an ensemble method, and/or a deep learning toolkit that work with the layers of the AI system to facilitate development of the AI model 530. For example, the ML framework 514 can distribute processes for application or training of the AI model 530 across multiple resources in the hardware platform 510. The ML framework 514 can also include a set of pre-built components that have the functionality to implement and train the AI model 530 and enable users to use pre-built functions and classes to construct and train the AI model 530. Thus, the ML framework 514 can be used to facilitate data engineering, development, hyperparameter tuning, testing, and training for the AI model 530. Examples of ML frameworks 514 that can be used in the AI system 500 include JAX, TENSORFLOW, PYTORCH, SCIKIT-LEARN, KERAS, LightGBM, and so forth.

The algorithm 516 can be an organized set of computer-executable operations used to generate output data from a set of input data and can be described using pseudocode. The algorithm 516 can include complex code that enables the computing resources to learn from new input data and create new/modified outputs based on what was learned. In some implementations, the algorithm 516 can build the AI model 530 through being trained while running computing resources of the hardware platform 510. This training enables the algorithm 516 to make predictions or decisions without being explicitly programmed to do so. Once trained, the algorithm 516 can run at the computing resources as part of the AI model 530 to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of the input stream 106 in FIG. 1) from various source computing systems described in relation to FIG. 1. Furthermore, training data can include pre-processed data generated by various engines of the anomaly detection platform described in relation to FIG. 1. The user may label the training data based on one or more classes and trains the AI model 530 by inputting the training data to the algorithm 516. The algorithm 516 determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine whether the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can include classification and/or regression. Classification techniques include teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for machine learning-based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format. The anomaly detection platform can use unsupervised learning to identify patterns in claim history (e.g., to identify particular event sequences) and so forth. In some implementations, performance of the scoring 114 that can use unsupervised learning is improved because the incoming input stream 106 is pre-processed and reduced, based on the relevant triggers, as described herein.

A few techniques can be used in unsupervised learning: clustering, anomaly detection, and techniques for learning latent variable models. Clustering techniques include grouping data into different clusters that include similar data, such that other clusters contain dissimilar data. For example, during clustering, data with possible similarities remain in a group that has fewer or no similarities to another group.

Examples of clustering techniques include density-based methods, hierarchical-based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or k-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model 530 using data from the data layer 502 and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model 530 of the AI system 500. The model structure 520 defines the complexity of the pattern/relationship that the AI model 530 expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how the node converts data received to data output. The structure layers may include an input layer of nodes that receive input data and an output layer of nodes that produce output data. The model structure 520 may include one or more hidden layers of nodes between the input and output layers. The model structure 520 can be an artificial neural network (or, simply, neural network) that connects the nodes in the structured layers such that the nodes are interconnected. Examples of neural networks include feedforward neural networks, CNNs, RNNs, autoencoder, an so forth.

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model 530 and the actual output of the AI model 530 and is used to guide optimization of the AI model 530 during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model 530. Examples of optimizers include Gradient Descent (GD), Adaptive Gradient Algorithm (AdaGrad), Adaptive Moment Estimation (Adam), Root Mean Square Propagation (RMSprop), and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and underfitting of the AI model 530. Overfitting occurs when the algorithm 516 is overly complex and too adapted to the training data, which can result in poor performance of the AI model 530. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constrain the resulting AI model 530 and improves its ability for generalized application. Examples of regularization techniques include lasso (L1) regularization, ridge (L2) regularization, dropout regularization, and elastic (L1 and L2) regularization.

The application layer 508 describes how the AI system 500 is used to solve problems or perform tasks. In an example implementation, the application layer 508 can include a front-end user interface of the anomaly detection platform.

Example Computing Environment of the Anomaly Detection Platform

Figure 6:
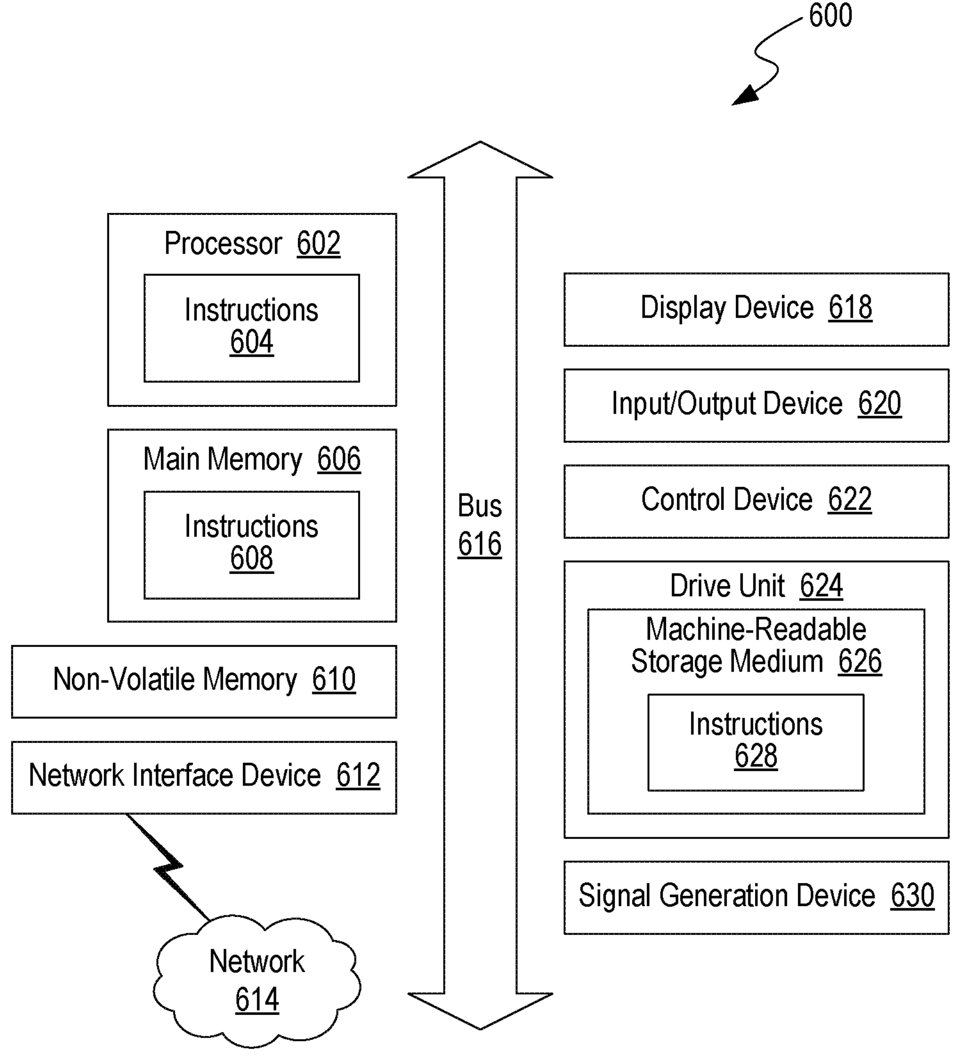
FIG. 6 is a block diagram showing some of the components typically incorporated in at least some of the computer systems and other devices on which the anomaly detection platform operates, in accordance with some implementations of the present technology.

FIG. 6 is a block diagram showing some of the components typically incorporated in at least some of the computer systems 600 and other devices on which the disclosed system operates, in accordance with some implementations of the present technology. As shown, an example computer system 600 can include: one or more processors 602, main memory 608, non-volatile memory 612, a network interface device 614, a video display device 620, an input/output device 622, a control device 624 (e.g., keyboard and pointing device), a drive unit 626 that includes a machine-readable medium 628, and a signal generation device 632 that are communicatively connected to a bus 618. The bus 618 represents one or more physical buses and/or point-topoint connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC) or a distributed system such as a mesh of computer systems or can include one or more cloud components in one or more networks. Where appropriate, one or more computer systems 600 can perform operations in real time, in near real time, or in batch mode.

The network interface device 614 enables the computer system 600 to exchange data in a network 616 with an entity that is external to the computer system 600 through any communication protocol supported by the computer system 600 and the external entity. Examples of the network interface device 614 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 608, non-volatile memory 612, machine-readable medium 628) can be local, remote, or distributed. Although shown as a single medium, the machine-readable medium 628 can include multiple media (e.g., a centralized/distributed database and/or associated caches and servers) that store one or more sets of instructions 630. The machine-readable (storage) medium 628 can include any medium that is capable of storing, encoding, or carrying a set of instructions for execution by the computer system 600. The machine-readable medium 628 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 610, 630) set at various times in various memory and storage devices in computing device(s). When read and executed by the processor 602, the instruction(s) cause the computer system 600 to perform operations to execute elements involving the various aspects of the disclosure.

Figure 7:
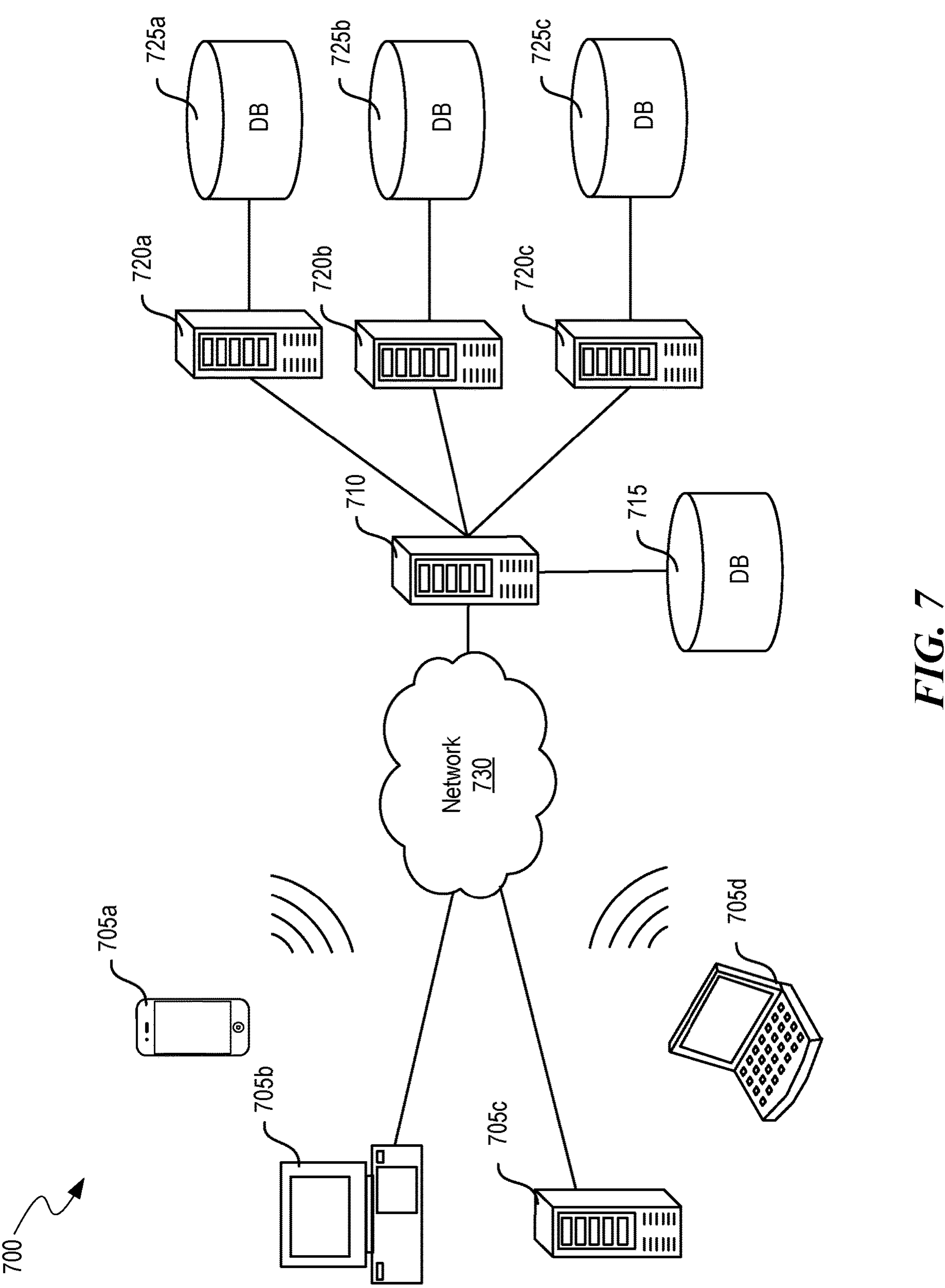
FIG. 7 is a system diagram illustrating an example of a computing environment in which the anomaly detection platform operates, in accordance with some implementations of the present technology.

FIG. 7 is a system diagram illustrating an example of a computing environment 700 in which the disclosed system operates in some implementations. In some implementations, the computing environment 700 includes one or more client computing devices 705A-D, examples of which can host the anomaly detection platform of FIG. 1. Client computing devices 705 operate in a networked environment using logical connections through network 730 to one or more remote computers, such as a server computing device.

In some implementations, server (e.g., server computing device 710) is an edge server that receives client requests and coordinates fulfillment of those requests through other servers, such as server computing devices 720A-C. In some implementations, server computing devices 710 and 720 comprise computing systems, such as the anomaly detection platform of FIG. 1. Though each server computing device 710 and 720 is displayed logically as a single server, each server computing device can be a distributed computing environment encompassing multiple computing devices located at the same or at geographically disparate physical locations. In some implementations, each server computing device 720 corresponds to a group of servers.

Client computing devices 705 and server computing devices 710 and 720 can each act as a server or client to other server or client devices. In some implementations, servers (710, 720A-C) connect to a corresponding database (715, 725A-C). As discussed above, each server computing device 720 can correspond to a group of servers, and each of these servers can share a database or can have its own database. Databases 715 and 725 warehouse (e.g., store) information such as claims data, email data, call transcripts, call logs, policy data, and so on. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. In some implementations, network 730 is the Internet or some other public or private network. Client computing devices 705 are connected to network 730 through a network interface, such as by wired or wireless communication. While the connections between server computing device 710 and server computing devices 720 are shown as separate connections, these connections can be any kind of local, wide area, wired, or wireless network, including network 730 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A system for modeling a physical environment, the system comprising:

at least one hardware processor; and at least one non-transitory memory storing instructions, which, when executed by the at least one hardware processor, cause the system to:

receive, during an interaction between a user and a conversational artificial intelligence (AI) avatar, an audio stream associated with the user;

generate, using the audio stream, an emotion feature vector that comprises a value set corresponding to one or more of: a pitch variation, a speech rate, a vocal intensity, or a spectral characteristic of the audio stream;

perform a first evaluation by comparing the emotion feature vector against a population database to generate a population anomaly score, wherein the population database comprises a first plurality of historical feature vectors derived from a first historical user interaction set, and wherein the population anomaly score is generated by determining a distance between the emotion feature vector and one or more cluster centroids derived from the first plurality of historical feature vectors associated with a plurality of other users in the population database;

perform a second evaluation by comparing the emotion feature vector against a protected database to generate a threat match score, wherein the protected database comprises a second plurality of historical feature vectors derived from a second historical user interaction set different from the first historical user interaction set, wherein each of the second plurality of historical feature vectors represents one or more protected categories, and wherein the threat match score is generated by applying an AI model configured to output a likelihood that the emotion feature vector corresponds to the one or more protected categories;

generate a risk score by aggregating the population anomaly score from the first evaluation and the threat match score from the second evaluation;

determine a response action using the risk score by evaluating the risk score against one or more threshold values derived from the population database and the protected database; and execute the response action by transmitting an instruction set associated with the response action as an input into the conversational AI avatar.

2. The system of claim 1, wherein the instructions further cause the system to:

generate an emotion trajectory by tracking one or more changes in the emotion feature vector over a duration of the interaction; and update the risk score based on the emotion trajectory.

3. The system of claim 1, wherein the instructions further cause the system to:

adjust the protected database by obtaining external data from one or more of: a research source, a social media source, or a news source; and update the second plurality of historical feature vectors based on the external data.

4. The system of claim 1, wherein the response action comprises causing the conversational AI avatar to output a question, and wherein the question is determined using the risk score.

5. The system of claim 1, wherein the emotion feature vector defines a background audio attribute indicative of a number of voices detected during the interaction.

6. The system of claim 1, wherein the instructions further cause the system to:

retrieve a user profile associated with the user;

compare the emotion feature vector against a user-specific baseline vector derived from the user profile; and adjust the population anomaly score using the comparison.

7. A non-transitory, computer-readable storage medium comprising instructions thereon, wherein the instructions, when executed by at least one data processor of a system, cause the system to:

access an input stream associated with an interaction between a user and an artificial intelligence (AI)-based avatar;

generate, using the input stream, an emotion feature vector that comprises a value set corresponding to one or attributes of the input stream;

comparing a vector representation of the input stream against a first database to generate a first score corresponding to a population anomaly score, wherein the first database corresponds to a population database and includes a first historical feature vector set that corresponds to a first historical user interaction set;

comparing the vector representation of the input stream against a second database to generate a second score corresponding to a threat match score, wherein the second database corresponds to a protected category database and includes a second historical feature vector set that corresponds to a second historical user interaction set, and wherein the second score represents a likelihood that the emotion feature vector corresponds to one or more protected categories indicated by the second historical user interaction set;

determine a third score corresponding to a risk score based on the first score and the second score;

determine an action using the third score by evaluating the third score against one or more criterion; and cause execution of the action by transmitting an instruction set associated with the action as an input into the AI-based avatar.

8. The non-transitory, computer-readable storage medium of claim 7, wherein the input stream comprises a video stream, and wherein the emotion feature vector comprises a physical expression attribute determined using the video stream.

9. The non-transitory, computer-readable storage medium of claim 7, wherein the instructions further cause the system to:

detect a difference between a first emotion indicated by the emotion feature vector and a second emotion indicated by a content of the input stream; and adjust the third score in response to detecting the difference.

10. The non-transitory, computer-readable storage medium of claim 7, wherein the instructions further cause the system to:

cause storage of a voice signature derived from the emotion feature vector in a data store.

11. The non-transitory, computer-readable storage medium of claim 7, wherein the instructions further cause the system to:

determine a geographic indicator associated with the interaction;

retrieve a demographic baseline corresponding to the geographic indicator; and adjust the first score based on a comparison between the emotion feature vector and the demographic baseline.

12. The non-transitory, computer-readable storage medium of claim 7, wherein the action comprises one or more of: logging the interaction, restricting an avatar action of the AI-based avatar, communicatively connecting the user with a human agent, or terminating the interaction, and wherein the action is selected based on the third score failing to satisfy a corresponding one of the one or more criterion.

13. The non-transitory, computer-readable storage medium of claim 7, wherein the instructions further cause the system to:

detect a synthetic voice indicator of a synthetic voice in the input stream; and adjust the third score in response to detecting the synthetic voice indicator.

14. A computer-implemented method for managing a conversational interaction based on user intent, the computer-implemented method comprising:

obtain an input stream associated with an interaction between a user and a digital avatar;

determine a first score corresponding to a population anomaly score by comparing a vector representation of the input stream against a population database that includes a first historical feature vector set corresponding to a first historical user interaction set;

determine a second score corresponding to a threat match score by comparing the vector representation of the input stream against a protected category database that includes a second historical feature vector set corresponding to a second historical user interaction set;

determine a third score corresponding to a risk score based on the first score and the second score;

determine an action using the third score by evaluating the third score against one or more criterion; and cause execution of the action by causing transmission of an instruction set associated with the action as an input into the digital avatar.

15. The computer-implemented method of claim 14, further comprising:

detecting a second voice in the input stream that is different from a first voice of the user; and adjusting the third score in response to detecting the second voice.

16. The computer-implemented method of claim 14, further comprising:

determining a temporal indicator associated with the interaction; and adjusting the third score based on a comparison between the temporal indicator and a historical temporal pattern associated with one or more of: the first or second historical user interaction set.

17. The computer-implemented method of claim 14, wherein the action comprises causing the digital avatar to output a question derived from a prior interaction with the user, and wherein the third score is updated based on a response to the question.

18. The computer-implemented method of claim 14, wherein the action is determined using an AI model, further comprising:

retraining the AI model based on one or more feedback signals of the interaction; and updating the second historical feature vector set using the retraining.

19. The computer-implemented method of claim 14, further comprising:

generating a question associated with an anomaly topic different from a current topic of the interaction; and causing the digital avatar to output the question in response to the third score failing to satisfy a threshold value.

20. The computer-implemented method of claim 14, further comprising:

comparing a transaction request associated with the interaction against one or more historical transactions associated with the user; and adjusting the third score based on a difference between the transaction request and the one or more historical transactions.

* * * * *